US009236770B2

(12) United States Patent
Gelman et al.

(10) Patent No.: US 9,236,770 B2
(45) Date of Patent: Jan. 12, 2016

(54) ATOMIC SELF-HEALING ARCHITECTURE IN AN ELECTRIC POWER NETWORK

(75) Inventors: Alexander Gelman, Smallwood, NY (US); Oleg Logvinov, East Brunswick, NJ (US); Lawrence Durfee, Washington, NJ (US); Samuel Mo, Monmouth Junction, NJ (US); Deanna Wilkes-Gibbs, Palo Alto, CA (US); Brion Ebert, Easton, PA (US)

(73) Assignee: STMicroelectronics, Inc., Coppell, TX (US)

( * ) Notice: Subject to any disclaimer, the term of this patent is extended or adjusted under 35 U.S.C. 154(b) by 2729 days.

(21) Appl. No.: 10/621,112

(22) Filed: Jul. 16, 2003

(65) Prior Publication Data

US 2005/0043858 A1 Feb. 24, 2005

Related U.S. Application Data

(60) Provisional application No. 60/396,369, filed on Jul. 16, 2002.

(51) Int. Cl.
| | |
|---|---|
| *G06F 15/173* | (2006.01) |
| *H02J 13/00* | (2006.01) |
| *H04L 29/08* | (2006.01) |
| *H04L 12/24* | (2006.01) |
| *H02J 3/14* | (2006.01) |

(52) U.S. Cl.
CPC ......... *H02J 13/0086* (2013.01); *H02J 13/0082* (2013.01); *H04L 41/08* (2013.01); *H04L 67/12* (2013.01); *H02J 2003/143* (2013.01); *Y02B 70/3216* (2013.01); *Y02B 70/3266* (2013.01); *Y02B 90/2615* (2013.01); *Y04S 20/221* (2013.01); *Y04S 20/242* (2013.01); *Y04S 40/121* (2013.01)

(58) Field of Classification Search
USPC .......................................... 709/238
See application file for complete search history.

(56) References Cited

U.S. PATENT DOCUMENTS

| | | | | |
|---|---|---|---|---|
| 5,237,511 | A * | 8/1993 | Caird et al. | 702/58 |
| 5,650,936 | A * | 7/1997 | Loucks et al. | 702/62 |
| 6,640,890 | B1 * | 11/2003 | Dage et al. | 165/203 |
| 6,650,876 | B1 * | 11/2003 | Ostman et al. | 455/103 |
| 6,751,562 | B1 * | 6/2004 | Blackett et al. | 702/61 |
| 6,944,555 | B2 * | 9/2005 | Blackett et al. | 702/62 |
| 6,961,641 | B1 * | 11/2005 | Forth et al. | 700/295 |
| 6,988,025 | B2 * | 1/2006 | Ransom et al. | 700/295 |

(Continued)

OTHER PUBLICATIONS

Teco and IBM: The "Smart house" IS Here; Newsbytes, Inc.; 2 pages.*

(Continued)

*Primary Examiner* — Richard G Keehn
(74) *Attorney, Agent, or Firm* — Slater & Matsil, L.L.P.

(57) ABSTRACT

In one embodiment of this invention, identical communicating node elements are constructed and placed throughout a power delivery network. Each of these node elements supplies features and options that facilitate peer-to-peer communications, data and service aggregation, propagated interfaces and distributed computational power. The network of interacting node elements, built with a common architecture, gives the power delivery network advanced capabilities for utilities and customers. These advanced capabilities include self-healing, highly secure communications, real-time interactions between any devices, and so on.

20 Claims, 5 Drawing Sheets

(56) References Cited

U.S. PATENT DOCUMENTS

| | | | |
|---|---|---|---|
| 7,124,397 B1 * | 10/2006 | Mathur et al. | 717/101 |
| 2002/0111755 A1 * | 8/2002 | Valadarsky et al. | 702/58 |
| 2005/0144437 A1 * | 6/2005 | Ransom et al. | 713/151 |
| 2006/0212194 A1 * | 9/2006 | Breed | 701/29 |
| 2008/0107188 A1 * | 5/2008 | Kennedy et al. | 375/259 |

OTHER PUBLICATIONS

"The IDC Engineers Pocket Guide", {51 pages} published 1994, 1995, 1996, 1997, 1998, 1999, 2000 and 2003 by IDC Technologies.*

* cited by examiner

ATOMIC SELF-HEALING ARCHITECTURE IN AN ELECTRIC POWER NETWORK

CROSS-REFERENCE TO RELATED APPLICATIONS

This application claims the benefit of U.S. Provisional Application No. 60/396,369, filed on Jul. 16, 2002. The disclosure of the above application is incorporated herein by reference.

FIELD OF THE INVENTION

The present invention relates to architectures for advanced communications within electric power networks at all levels from generation sites to final power consumption end-points. The purpose of the communications is to create a power delivery system capable of furnishing utilities and customers with advanced features including the ability of the delivery network to self-heal.

BACKGROUND OF THE INVENTION

There is considerable interest today in an advanced power delivery system that would embed sophisticated networking and information communicating and processing components within the power distribution grid. With such a system, it would be possible to control power usage in heretofore unrealized ways, to implement a power distribution network that:
  Is self-healing,
  Is secure,
  Provides for market based pricing features,
  Supports a wide variety of different local and remote power generation systems,
  Has advanced data communications features for end customers,
  Interacts with consumer power-consumption devices, and
  Facilitates real time and other interactions between any elements While the uses of such an advanced power delivery system are many, such an advanced power delivery system would create a highly advantageous environment in which to deploy smart appliances that:
  Can communicate with one another peer-to-peer,
  Can form part of a distributed computing infrastructure,
  Can propagate their control interface to another entity, allowing heretofore unrealized remote control and system integration via proxy,
  Can communicate over the internet, and
  Can participate in sophisticated, real-time control schemes.

Until now, however, such advanced power delivery systems have not been practical due to the lack of sophisticated architecture that would support the above capabilities and features. The present invention provides such an architecture through the use of a highly flexible Node Element that may be configured to meet the needs of each specific application, spanning the power generation point to the final consumption points.

SUMMARY OF THE INVENTION

In accordance with one aspect, the invention provides an advanced communications system for an electric power network. More specifically, the advanced communications system implements an architecture that utilizes a Node Element, deployable on the electric power network, that has a global port and an inward port. The Node Element further has a global dfata store that is populated with information supplied via the global port and which is accessible via the local part. The Node Element also has a local data store that is populated with information supplied via the global port and which is accessible via the local port. The Node Element also has a local data store that is populated with information supplied via the local port and is accessible via the global port. The Node Element is configured to selectably support at least one of three planes of interaction, using information maintained within the global and local data stores. The three planes of interaction include a power analysis plane of interaction, a data plane of interaction, and a control plane of interaction.

In accordance with another aspect, the invention provides a method for facilitating interactions among a plurality of devices coupled to one another over a utility power network. The devices may have power and analysis monitoring capability, control and communication capability, and combinations thereof. The method entails providing each of the devices with an inward port, for establishing at least one of a power and analysis monitoring, control and communications link with at least one second device of the plurality of devices which is located downstream in the network;

The method further entails providing each of the devices with a global port for establishing at least one of a power and analysis monitoring, control and communications link with at least one third device of the plurality of devices which is located upstream in or at a same network layer portion of the network; and Additionally, the method entails providing each of the devices with at least one globally available local interface, wherein the globally available local interface extracts interaction data from the links established at the global port or the inward port and processes the interaction data to identify source and destination devices corresponding to the established links and to identify at least one of distributed computing instructions, data aggregation instructions, device control instructions and aggregated data clusters, wherein the globally available local interface universally formats at least a portion of the interaction data associated with the link established at the inward port for transmission to at least one of the second device and the third device.

In yet another aspect, the invention provides an appliance for coupling to an electric power network. The appliance includes an appliance processor that supports an appliance control interface having an associated data store of appliance control data. The appliance is provided with a Node Element having a global port coupled to the electric power network and an inward port configured to access the data store of appliance control data. The node element is configured to propagate the appliance control interface though the global port, thereby allowing access to the data store of appliance control data from the electric power network.

For a more complete understanding of the invention, as well as its many objects and advantages, refer to the remaining specification and to the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS the following description of the preferred embodiment(s) is merely exemplary in nature and is in no way intended to limit the invention, its application, or uses.

Figure 1:
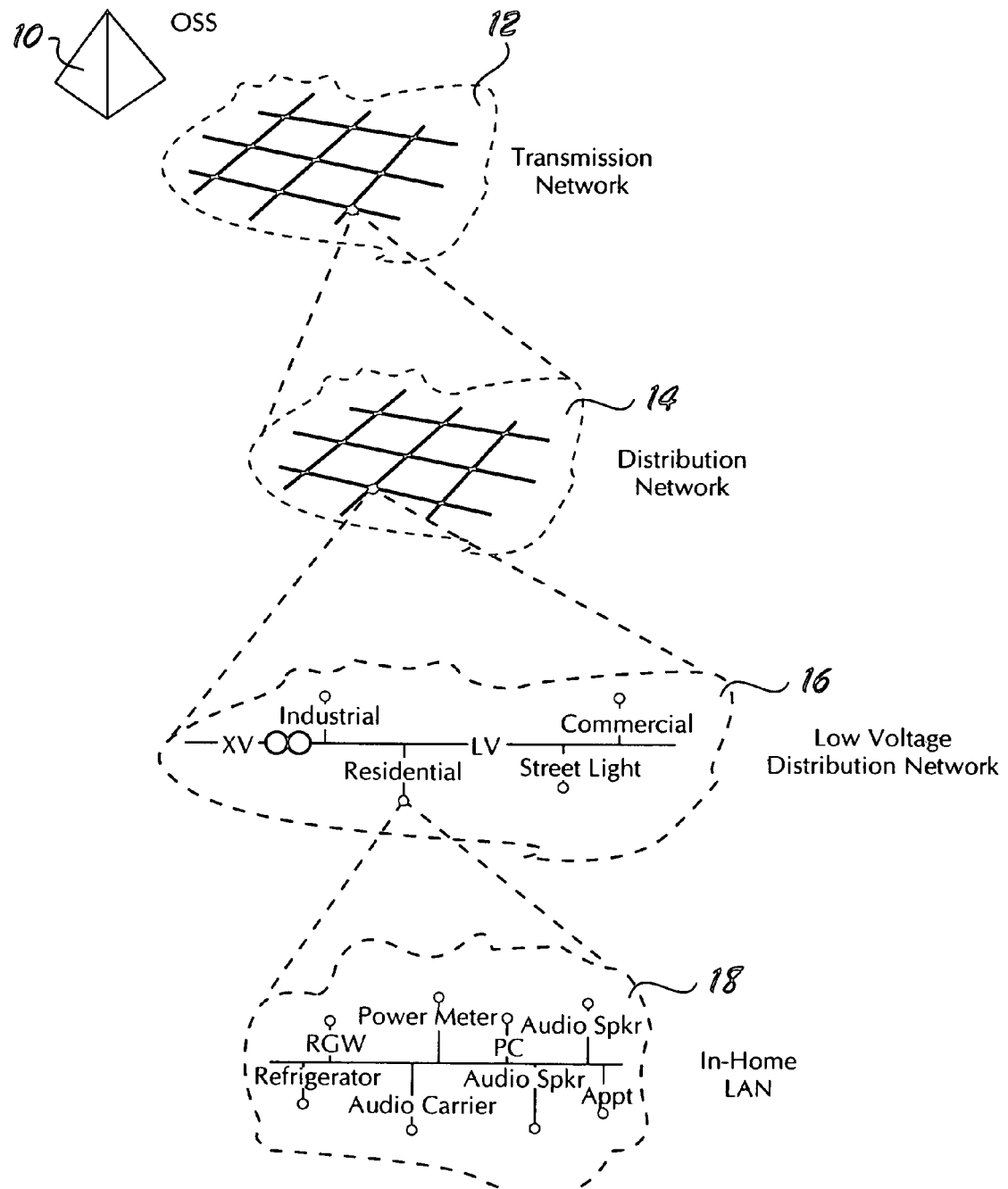
FIG. 1 provides a conceptual view of the overall electric power distribution network from generation sites all the way to final consumption points.

The general concept of power delivery from generation points to consumption points is shown in FIG. 1. The operational support system (OSS) component 10 at the top depicts the pervasive nature of OSS (operational support system) and that it participates in the process at all levels.

One goal of this invention is to provide architectures and architectural elements for interactions between network elements to facilitate an advanced power delivery system that can, among other things:

Be self-healing
Be secure
Provide for market based pricing features
Support a wide variety of different local and remote power generation systems
Have advanced data communications features for end customers
Interact with consumer power-consumption devices
Facilitate real time and other interactions between any elements There are three important portions, which are (see FIG. 1):
Power hierarchy
  Multiple generation points feed into the transmission grid (High Voltage or HV). In FIG. 1, see transmission network 12.
  Points on the transmission grid feed into distribution grids (Medium Voltage or MV). In FIG. 1, see distribution network 14.
  Points on the distribution grid fee into LV (Low Voltage) networks and then to individual consumption points (e.g., industrial locations, commercial establishments, individual homes, street lights and so on). In FIG. 1, see low voltage distribution network 16.
  Inside the home, there are many power consumption points (e.g., Heating, Ventilation and Air Conditioning or HVAC, domestic hot water heaters or DHW, etc.). In FIG. 1, see the exemplary in-home LAN 18.
Interworking hierarchy
  Transmission grid interworking network would be based on high speed fiber
  Distribution grid interworking could be based on various different forms (e.g., Power Line Communications or PLC, Local Multipoint Distribution System or LMDS, Multi-channel Multipoint Distribution Service or MMDS, etc.)
  Communications at power consumption points inside the home could use various forms as well (e.g., PLC, Home Phone Line Alliance or HPNA, wireless such as 802.11a, IEEE1394, Ethernet, etc.)
  OSS oversees the entire network in a distributed fashion
Node Elements
  Supports many physical and logical interfaces
  Facilitates interactions between dissimilar devices
  Permits efficient distributed processing among nodes
  Allows peer-to-peer style interactions among nodes
  Generates structured aggregates (e.g., data, services, etc.) on all devices on the inward port
  Maintains global structured aggregates on all global port devices (e.g., data, services, etc.)
  Makes selected local interfaces available to elements at any level in the hierarchy This architecture advocates using one basic structure, namely the Node Element described later, and applying it throughout the advanced power network. The Node Element has optional features and different performance levels to meet a wide range o needs. Each Node Element instantiation has a specific set of features and performance levels that are tailored to that location.

Figure 2:
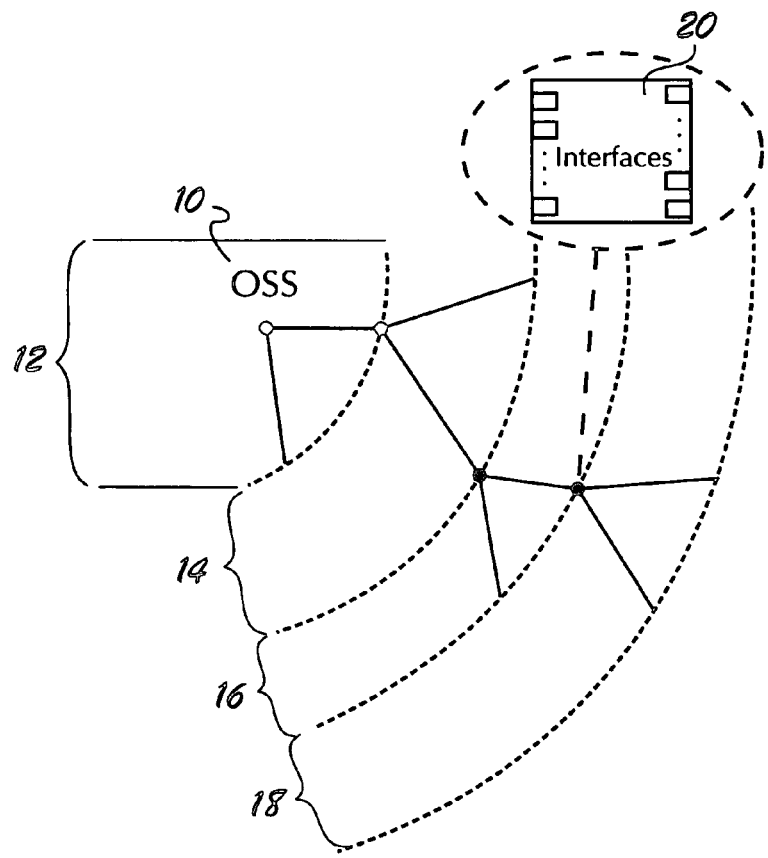
FIG. 2 shows the layers in the overall power delivery network and the notion that a node element common to all nodes can be used as the central ingredient of an advanced power delivery network.

A common structure can be used, as proposed above, at each node at every layer throughout the network, as diagrammed in FIG. 2, because a shared set of capabilities including peer-to-peer interactions, distributed computing, interface propagation and data aggregation fulfills the requirements for all applications. In FIG. 2, Node Elements are shown as black dots. As will be more fully described herein, these Node Elements make it possible to propagate interfaces, such as interface 20 across the network, to essentially any network layer, as needed.

A peer-to-peer capability makes interactions potentially more efficient and more reliable. Distributed computing permits using more powerful computational methods and allows for autonomous operation. Data aggregation supplies a nodes distributed computations with the data needed to carry out their tasks. Propagating interfaces provides effective and direct remote, real-time control of devices between any two locations in the network.

This architectural theme is to use a single highly flexible Node Element, configured to meet the needs of each specific application, to build an advanced power network from generation points to final consumption points.

The proxy concept allows vastly different devices (e.g., PC's, HVAC units, etc.) connected with vastly different communications networks (e.g., wireless, HPNA, PLC, etc.) to interact with each other to exchange information and control commands. Moreover, the concept allows elements deep in the global network to have precise and real-time control over devices by assessing their interfaces directly through the proxy.

Self-healing is made possible because of the continuously updated Global Structured Aggregate information available at each node and the small autonomous subnets formed with peer-to-peer interactions. Given these features, it is possible to built a network that can anticipate or have knowledge of network faults and reconfigure to compensate.

Where there is a choice of communications within the power network, different choices in different parts of the network will be selected to meet the demands of the installation, to meet financial objections or to meet other goals. Therefore, the network will consist of many different forms. Furthermore, devices within the network that need to interact with other devices may use different protocols, have different capabilities and so forth. The concept of proxy interfaces provides an interface between dissimilar technologies and allows them to interact.

This interaction is further enhanced with several other features. The first is the ability of the node elements to make local interfaces, from devices in their sub-networks, available to devices at various locations within the global network. The next is to promote efficient distributed processing among node elements. Finally, peer-to-peer style communications is made available to all node elements.

Figure 3:
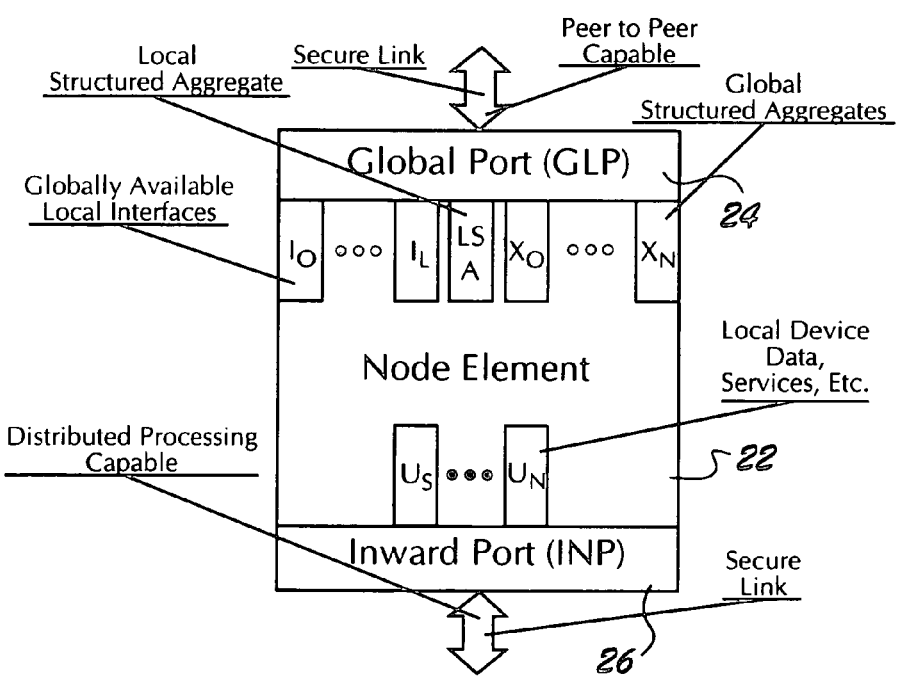
FIG. 3 shows the key parts of the Node Element.

Node Element. The concept of a node element is shown in FIG. 3. The node element has two external ports; one for interactions with the global network (Global Port or GLP) and the other interacts with a subset network (Inward Port of INP).

The GLP (Global Port) gives access to the inward networks structured aggregate (Local Structured Aggregate or LSA) as well as certain local interfaces. Additionally, the GLP maintains the global structured aggregates (GSA) for use by the proxy and the inward network devices. The inward port maintains the inward networks local device data, services and so on.

Efficient peer-to-peer communications among node elements is part of the design of the GLP/INP. Global availability of local device interfaces along with peer-to-peer communications make real-time control possible. What's more, with less entities directly involved in the interactions, there is a higher level of reliability.

Distributed computing among node elements gives the network more autonomy and is a built-in feature of each node element. Global aggregates are used in distributed computing for a portion of the data used in computations.

Built-in features of every communications link will include security and quality of service (QOS) capabilitites. If an existing communications technology is being considered, it must meet the requirements or be capable of being supplemented to meet the requirements else it will be rejected for the intended application.

Figure 4:
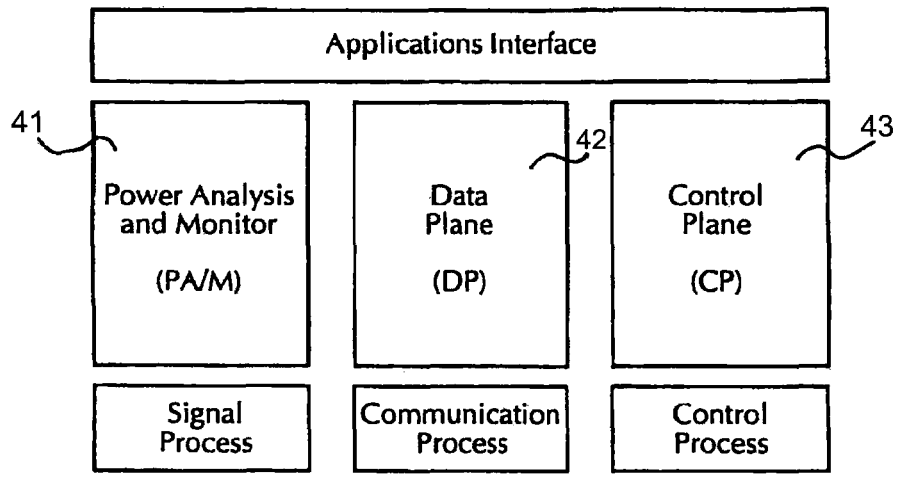
FIG. 4 depicts three types of interactions supported by the Node Element.

Planes of Interaction. There are three planes of interactions at each node; namely, Power Analysis and Monitor (PA/M) 41, Data Plane (DP) 42 and Control Plane (CP) 43 and this concept is presented in FIG. 4.

The PA/M (Power Analysis and Monitor) plane of interaction 41 can be used for implementing, for example, Power Quality of Service (pQoS). The DP (Data Plane) of interaction 42 is for data communications such as connections to the Internet. The CP (Control Plane) 43 is used to make real time adjustments, as an example, to power consumption devices such as HVAC units to meet local and/or global objections.

Node Elements. Identical node elements are employed throughout the power network. Node elements are modular blocks with a set of optional features that can be included or excluded based on the needs of the specific application. Optional features include:

Real-Time Interface Propagation (i.e., interface details)
Aggregate Method (i.e., which variables, which services, etc.)
Support for PA/M, DP and/or CP The node elements have options, again the choice depends on the application, and they include:

Communications security options (e.g., DES, $_3$DES, etc.)
Communications QoS options (e.g., best effort, committed information rate, etc.)
Performance options (e.g., hard real-time, real-time, on-line, etc.)
Computational options (e.g., signal processing, data processing, etc.)

The choice of options and features would be determined for a specific application by examining the application and extracting requirements. These application requirements would then be transformed into parameters used to choose features and options.

Application Examples. As a way to clarify the concepts, the following paragraphs use examples to illustrate how the concepts can be used.

Figure 5:
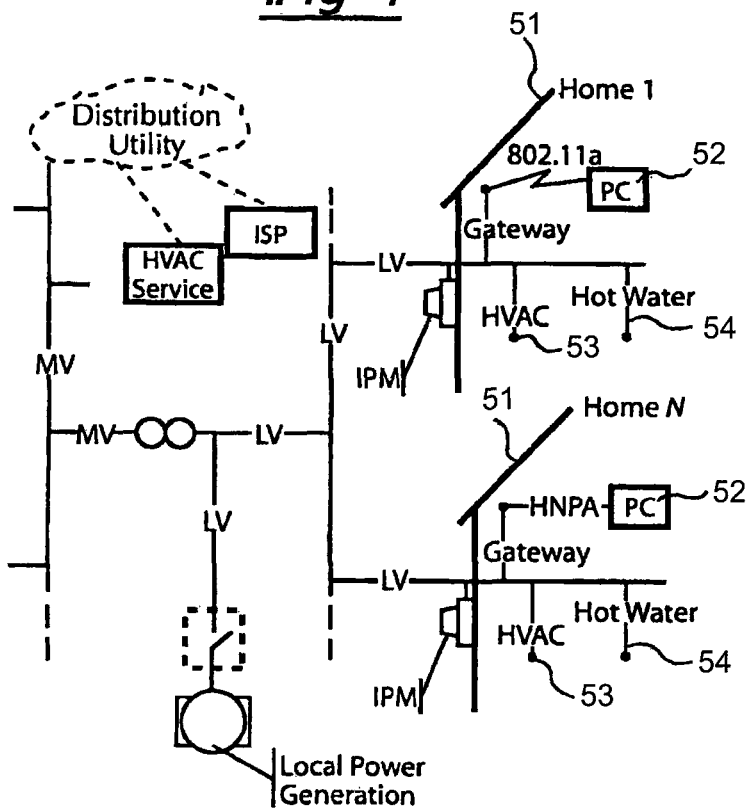
FIG. 5 is an example, for the sake of discussion, of a possible residential deployment.

One of many possible arrangements for residential installations is shown in FIG. 5. This configuration represents a realistic subset of devices in a home 51 and the configuration will be used to explain the overall concept. It is important to note that this example is but one of many and in no way restricts then generality of the invention.

In this particular example, the communications form for power consumption devices in each house is in-home PLC (e.g., Home Plug Alliance or HPA). Data communications between the gateway and a PC 52 (e.g., Internet access) in one case is with wireless (802.11a) and the other is HPNA. Even supposing all the devices in the home use the same PLC technology, make note that they may be built by different manufacturers, each home may have different product models, their logical interfaces may be different, and each has different capabilities. Access PLC is used, for this particular example, at the LV and MV distribution, although the concept is general and any form would work.

Each device has its own capabilities and may have a unique commence interface. For example, the HVAC system 53 would have controls for activating the ventilation fans (e.g., controlled to maintain air freshness), the heating element (e.g., controlled to keep the home warm in the cold weather) and the air conditioning pump (e.g., controlled to keep the home cool in the summer). It would also use, among other possible inputs, environmental conditions from indoor and outdoor sensors such as temperature and humidity to operate. The water heater 54 has only one control function; namely to maintain a constant water temperature, although it could use some of the same inputs as the HVAC system. Since there are many makes and models of these types of equipment, note that there will be different command structures and protocols for each.

Figure 6:
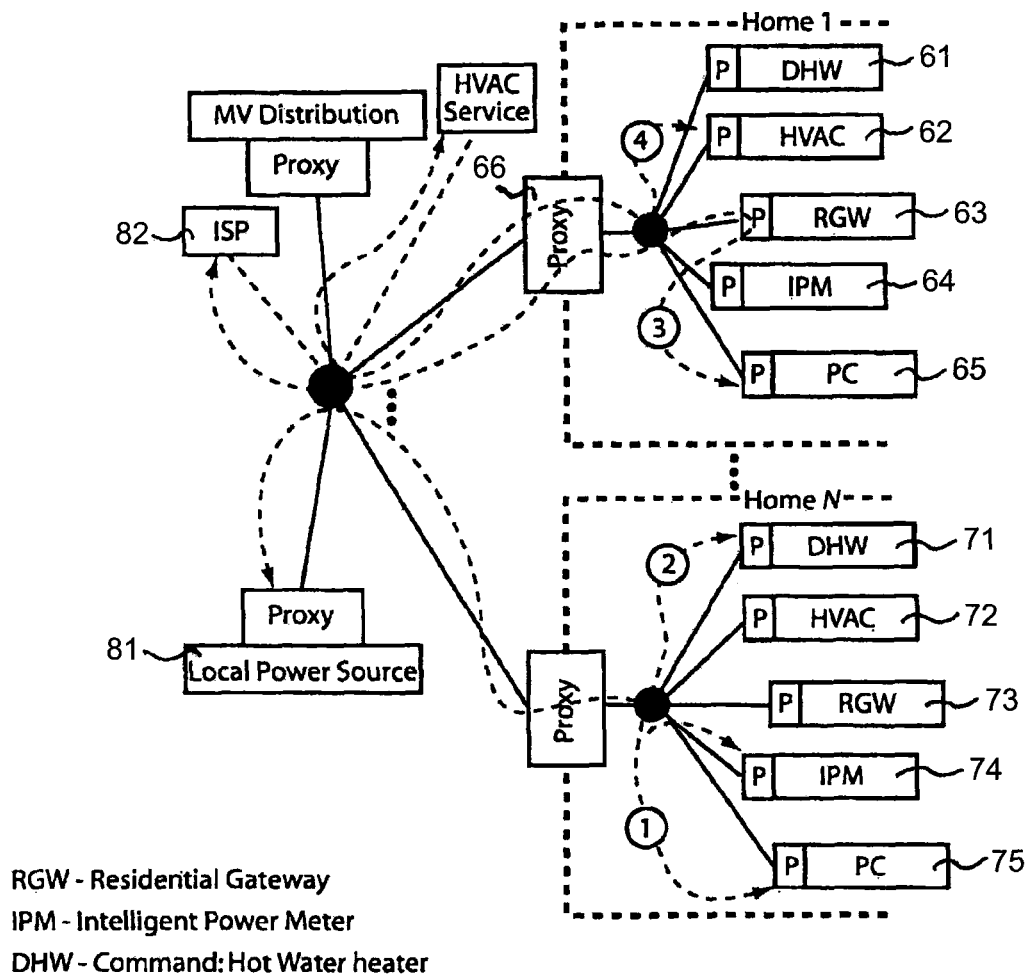
FIG. 6 is an example with four different logical interactions shown.
Figure 7:
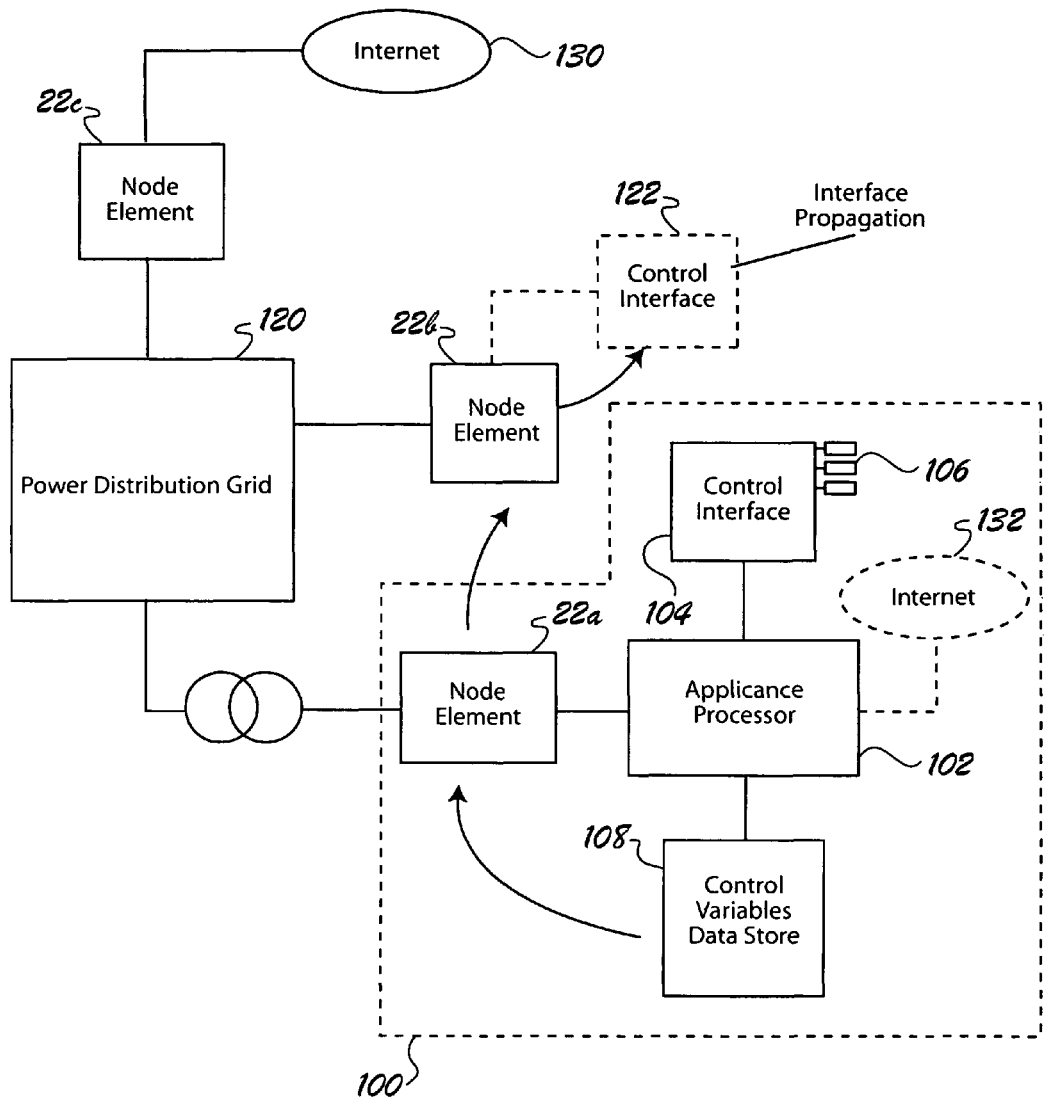
FIG. 7 is an exemplary appliance utilizing the node element and communication system of the invention.

The logical picture in FIG. 6 shows the devices interaction opportunities and some specific examples. The node elements may be physically located within devices (e.g., residential gateway or RGW, DHW, etc.) r as a stand-alone piece of equipment.

Interactions between all the devices are possible to take advantage of the distributed nature of the network and to allow this sub-network to be more autonomous from the remainder of the power supply chain.

One example of device interactions (Example 1) between the HVAC unit 72 and the IPM 74 (Intelligent Power Meter) in Home N. The two device proxies allow them to interact, pass data back and forth, exchange capabilitites and so on. this interaction may be used to take advantage of market based power pricing by setting the in-home temperature to a bit higher level in the summer during times when the price of electricity is higher. In this example, interactions between the two devices are peer-to-peer and yet each device has access to information from other entities (e.g., the IPM 74 gets pricing information from entities in the global network, etc.). Distributed computing is utilitized to accomplish the task (e.g., the HVAC unit's temperature, humidity and air freshness control system; the ability of the IPM 74 to fetch pricing data and make predictions if the data is not available, etc.) and the task can be performed more or less autonomously, depending on prevailing conditions.

Another example of interactions between devices (Example 2) is shown in the figure between the hot water heater (DHW) 71 in Home N and the local power source 81. Again, the various proxies allow these two devices to interact and exchange information and control. The interaction may be a query by the hot water heater 71 to determine if there is sufficient power for a requested water demand for the dishwasher to start. The ability of the two devices to communicate peer-to-peer means that the decision-making process happens quickly and directly. Each of the two devices has access to other network devices (e.g., the DHW 71 is in contact with the dishwasher and the Local Power Source 81 is in constant contact with the generation and distribution grid). Each device has its own computing tasks (e.g., the DHW 71 runs a control algorithm for maintaining temperature and changing the setting to meet existing conditions, while the local power source 81 monitors its internal condition to determine available energy levels).

As a data plane example (Example 3), the figure shows a PC in Home 1 interacting with an ISP to access the Internet. The residential gateway has an 802.11a proxy 66 to make the connection to the PC 65 and then to the ISP 82 at the other end.

The proxy concept allows direct device interfaces to be made available at different levels in the hierarchy. So, for instance (Example 4), the interface to the HVAC system 62 in Home 1 may have its entire control interface available to a service element in the distribution network to enable a home service contract to be maintained. That is, the service element would query the HVAC system 62 on a regular basis to access operational data (e.g., fan total run time to determine filter replacement needs, etc.). It may need to control the unit to verify that it is operating within set limits (e.g., start the burner to view the color and size of the flame). Armed with this data, a service call could be scheduled toreplace parts or perform needed maintenance.

These are but a few of the many examples of how the concept would permit the development of an advanced power delivery network.

The description of the invention is merely exemplary in nature and, thus, variations that do not depart from the gist of the invention are intended to be within the scope of the invention. Such variations are not to be regarded as a departure from the spirit and scope of the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In an electric power network, an advanced communications system employing an atomic communications system architecture, comprising:
  a plurality of node elements deployable on said electric power network and each having a respective global port and an inward port, the electric power network having a plurality of hierarchy levels, including a hierarchy of high voltage, medium voltage, and low voltage, and wherein at least one node element is deployed at each hierarchy level;
  each node element having a global data store that is populated with information supplied via said global port and is accessible via said inward port;
  each node element having a local data store that is populated with information supplied via said inward port and is accessible via said global port;
  each node element being configured to selectably support at least one of three planes of interaction using the information maintained within said global and inward data stores:
  a power analysis plane of interaction,
  a data plane of interaction, and
  a control plane of interaction,
  wherein each node element allows a plurality of load devices to exchange data, through the node element, using respective different protocols of the load devices; and
  wherein each node element includes a proxy having a universal format interface that makes available a local control interface of a first local load device available and that allows remote control of the first local load device, through the universal format interface, using a universal format different from a local control protocol of the first load device.

2. The communications system architecture of claim 1 wherein each node element is implemented using modular blocks providing sets of features that can be selectively included or excluded.

3. The communications system architecture of claim 1 wherein each node element is adapted to selectively enable and disable selected ones of said planes of interaction.

4. The communications system architecture of claim 2 wherein said sets of features include features to selectively enable and disable said planes of interaction.

5. The communications system architecture of claim 1 wherein said global data store is configured to store aggregate information that is periodically updated, wherein the aggregation information provides knowledge of faults in the electric power network, wherein the node element is reconfigured for supporting at least one of the three planes of interaction based on the knowledge.

6. The communications system architecture of claim 1 wherein said local data store is configured to store aggregate information that is periodically updated.

7. The communications system architecture of claim 1 wherein said local data store is configured to store local interface information about with a device associated with said node element.

8. The communications system architecture of claim 1 wherein a first node element is configured to acquire local interface information about a device associated with said node element and to propagate that local interface information to another node element on said electric power network.

9. The communications system architecture of claim 8 wherein said first node element acquires local interface information through said inward port and propagates said local interface information through said global port.

10. The communications system architecture of claim 1 wherein said node element implements said power analysis plane of interaction to collect and disseminate power quality of service information.

11. The communications system architecture of claim 1 wherein said node element implements said data plane of interaction to couple a device associated with said node element to an external source of information.

12. The communications system architecture of claim 11 wherein said external source of information is the internet.

13. The communications system architecture of claim 1 wherein said node element implements said control plane of interaction to control a device associated with said node element.

14. The communications system architecture of claim 1 wherein said node element implements said power analysis plane of interaction and said control plane of interaction to assess power conditions on said electric power network and to control a device associated with said node element to meet a predefined objective.

15. The communications system architecture of claim 14 wherein said predefined objective is a self-healing objective to selectively control power consumption to thereby balance load on said electric power network.

16. The communications system architecture of claim 1 wherein each node element implements a proxy mechanism whereby a device associated with said node may be controlled by entities external to said device that are coupled to said electric power network.

17. The communications system architecture of claim 1 wherein each node element implements data encryption to control access to information via said global port.

18. The communications system architecture of claim 1, wherein the universal format interface of the proxy is at a first hierarchy level different from the level of the first local load device and allows remote control of the first local load device at the first hierarchy level.

19. The communications system architecture of claim 1, wherein each node element retrieves and stores data from each of a first plurality of devices using a respective different protocol of that device.

20. The system of claim 1 wherein at least one of said plurality of load devices consumes or generates power.

* * * * *